US011623573B2

(12) United States Patent
Adams

(10) Patent No.: US 11,623,573 B2
(45) Date of Patent: Apr. 11, 2023

(54) VEHICLE STEP-UP AND PROTECTION DEVICE

(71) Applicant: Gary Adams, Phoenix, AZ (US)

(72) Inventor: Gary Adams, Phoenix, AZ (US)

( * ) Notice: Subject to any disclaimer, the term of this patent is extended or adjusted under 35 U.S.C. 154(b) by 164 days.

(21) Appl. No.: 17/183,609

(22) Filed: Feb. 24, 2021

(65) Prior Publication Data

US 2022/0266754 A1 Aug. 25, 2022

(51) Int. Cl.
*B60R 3/02* (2006.01)
(52) U.S. Cl.
CPC ..................................... *B60R 3/02* (2013.01)
(58) Field of Classification Search
CPC ....................................................... B60R 3/02
See application file for complete search history.

(56) References Cited

U.S. PATENT DOCUMENTS

| 5,088,339 A * | 2/1992 | Lochmoeller | F16H 25/2015 74/89.37 |
| 5,518,283 A * | 5/1996 | Egelske | B60R 13/04 293/118 |
| 9,994,168 B1 * | 6/2018 | Jensen | B60R 3/02 |

* cited by examiner

*Primary Examiner* — Bryan A Evans
(74) *Attorney, Agent, or Firm* — Morgan Law Offices, PLC

(57) ABSTRACT

A device for a high-clearance motor vehicle is provided. Preferably, the device comprises a linear actuator, a hollow tube having a first helix and a second helix; a step arm connected at a distal end to the linear actuator such that when the linear actuator applies a linear force to the step arm, the step arm rotates. A first end portion of a distal end of the step arm inserted in the hollow tube extends through the first helix and a second end portion of the distal end of the step arm inserted in the hollow tube extends through the second helix. When the device is operated, depending on user selection, the device can serve as a vehicle step, protect the vehicle door(s), or be in a retracted position.

8 Claims, 13 Drawing Sheets

VEHICLE STEP-UP AND PROTECTION DEVICE

FIELD OF THE INVENTION

The present invention relates to the field of motor vehicle accessories, and, more particularly, to a motorized step for a motor vehicle that also acts as a vehicle protection device when retracted.

BACKGROUND

In recent years, larger motor vehicles such as pick-up trucks and SUVs have become popular. However, these vehicles have higher ground clearance making it more difficult to enter the vehicle. While many of these vehicles have running boards to make stepping up into the vehicle somewhat easier, these are placed too high for many individuals and can collect dirt and mud during driving which is then tracked into the vehicle. In the winter, snow and ice can build up on the running boards, creating a potentially dangerous situation.

Various patents exist for step-up devices to make entry into a motor vehicle easier. For example, U.S. Pat. No. 7,584,975 to Leitner, entitled Retractable Vehicle Step, discloses a vehicle step having a single arm that allows the step to be positioned and to retract. As another example, U.S. Pat. No. 7,017,937 to Henderson et al., entitled Power Operated Running Board, discloses a running board that can be automatically positioned or retracted. In both of these patents, when the step is retracted, it is placed into a position below the vehicle door.

SUMMARY OF THE INVENTION

According to preferred embodiments of the present invention, a step-up and protection device for a high-clearance motor vehicle is provided. Preferably, one such device is installed along the driver-side of the motor vehicle and an another such device is installed along the passenger-side of the motor vehicle. Preferably, the devices can be activated by remote control or by the driver of the vehicle.

A device for a high-clearance motor vehicle is provided. Preferably, the device comprises a linear actuator, a hollow tube having a first helix and a second helix; a step arm connected at a distal end to the linear actuator such that when the linear actuator applies a linear force to the step arm, the step arm rotates. A first end portion of a distal end of the step arm inserted in the hollow tube extends through the first helix and a second end portion of the distal end of the step arm inserted in the hollow tube extends through the second helix. When the device is operated, depending on user selection, the device can serve as a vehicle step, protect the vehicle door(s), or be in a retracted position.

By blocking the door of the motor vehicle from opening, the device acts as a security device making it difficult to steal the motor vehicle. Additionally, when the step is retracted, the step impedes potential "ding" damage from an adjacent motor vehicle by shielding the motor vehicle from damage from the door of the adjacent motor vehicle.

These and other aspects, features, and advantages of the present invention will become apparent from the following detailed description of preferred embodiments, which is to be read in connection with the accompanying drawings.

DETAILED DESCRIPTION

Figure 1:
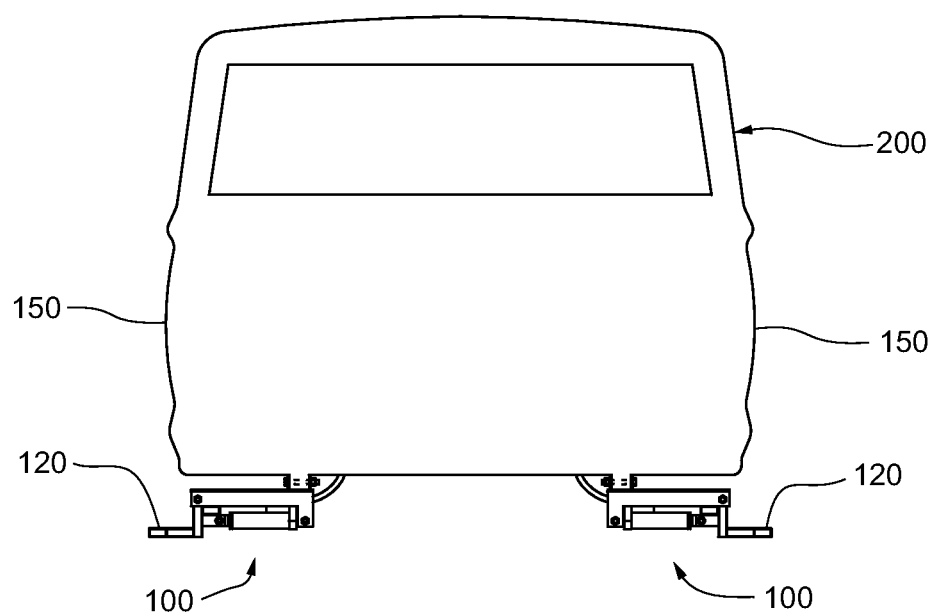
FIG. 1 shows a pair of exemplary step-up protection devices on a vehicle in the step-up position.
Figure 2:
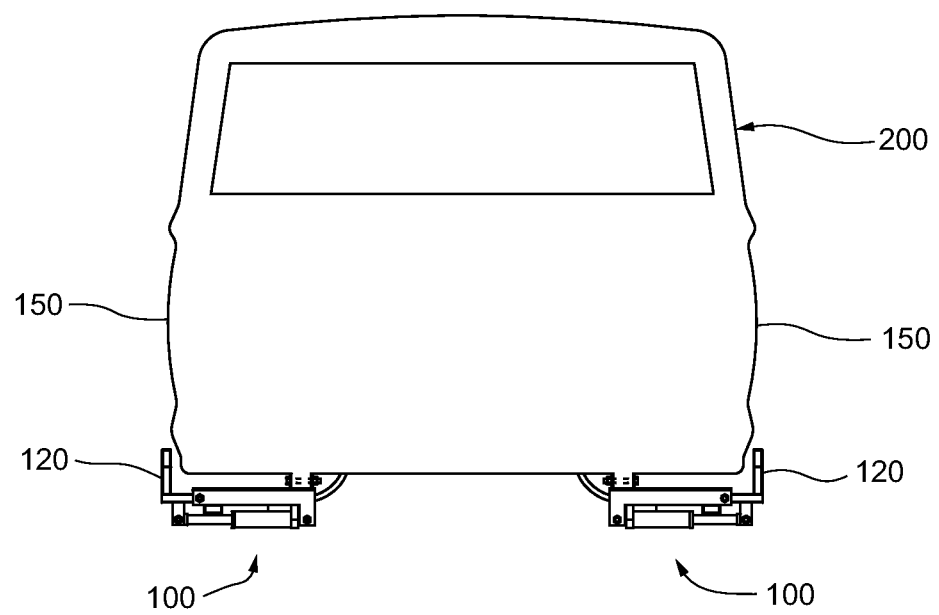
FIG. 2 shows the exemplary devices on the vehicle in the retracted position.

FIGS. 1 and 2 illustrate a pair of exemplary step-up protection devices 100 installed on a motor vehicle 200. As depicted, one such device 100 is installed beneath the vehicle body 105 along the driver-side of the motor vehicle 200 and another such device 100 is installed beneath the vehicle body 105 along the passenger-side of the motor vehicle 200. FIG. 1 shows the exemplary devices 100 in the step-up position; FIG. 2 shows the devices 100 in the retracted position.

Figure 3:
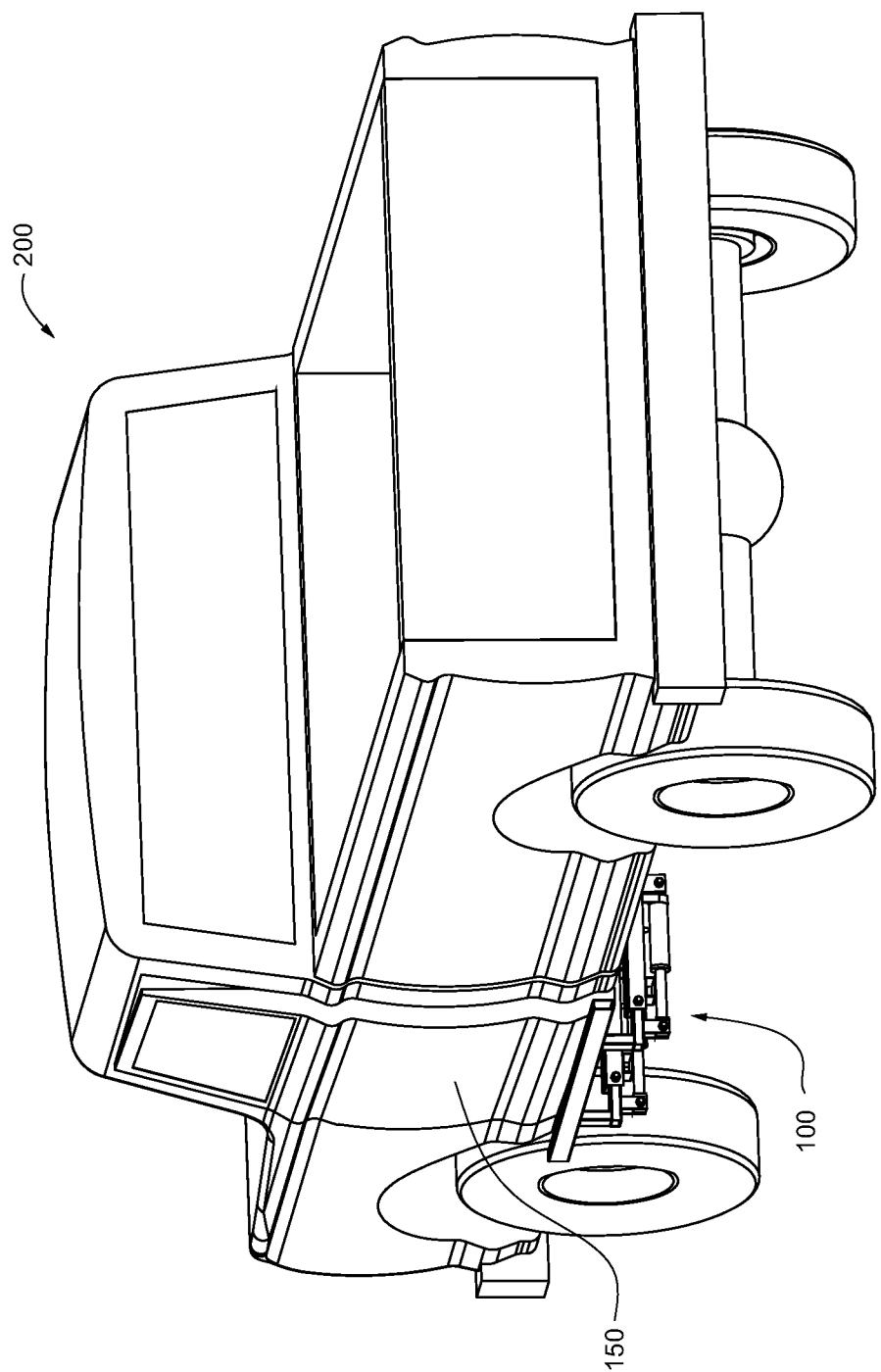
FIG. 3 shows a side view of a vehicle with an exemplary step-up protection device in the retracted position.

As will be described in greater detail, when a person wishes to enter or leave the vehicle 200, a device 100 on the desired entry side is activated such as to cause the step to be positioned. When not being used as a step-up device, the device 100 is retracted. When in the retracted position, the device 100 blocks the door 150 of the vehicle 200 from opening making it difficult to steal the motor vehicle. FIG. 3 illustrates a driver side view of the vehicle 200 with an exemplary step-up protection device 100 in the retracted position, more clearly illustrating this aspect of the invention. Additionally, when the step is retracted, the step impedes "ding" damage from an adjacent motor vehicle.

Preferably, the devices 100 are powered by the battery of the motor vehicle 200, and can be activated by remote control or by the driver of the vehicle from a control inside the motor vehicle 200. Preferably, the user will be able to select whether to activate either the device 100 on the driver side or the one on the passenger side, or both; and select whether the device 100 is to be positioned toward the step-up position or retracted.

Figure 4A:
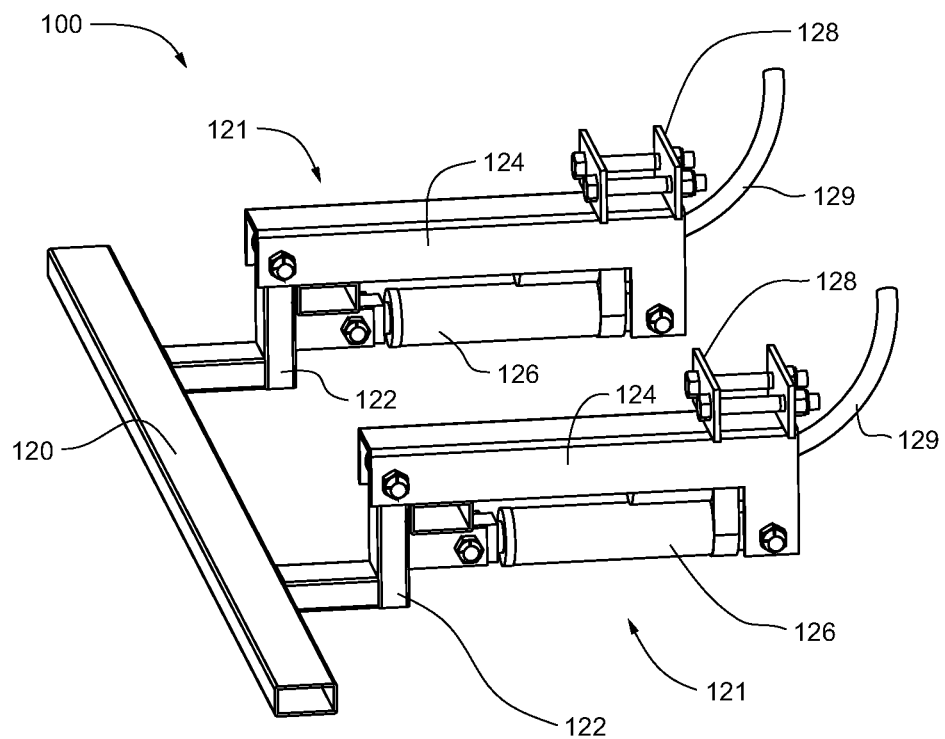
FIG. 4A shows a close-up view of the exemplary step-up protection device in the step-up position.
Figure 4B:
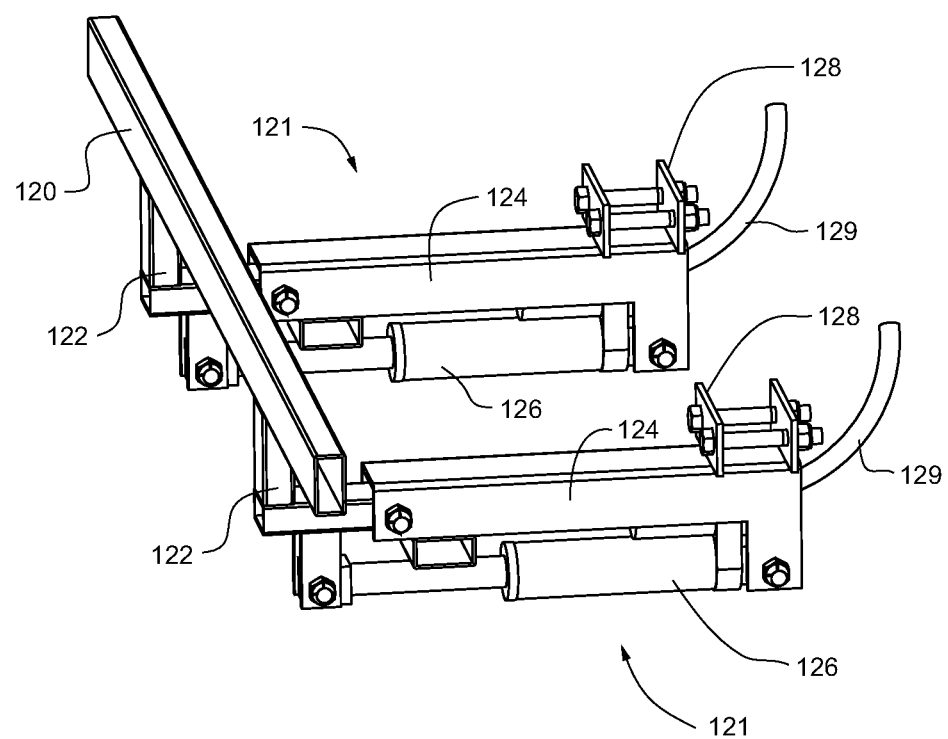
FIG. 4B shows a close-up view of the exemplary step-up protection device in the retracted position.
Figure 5:
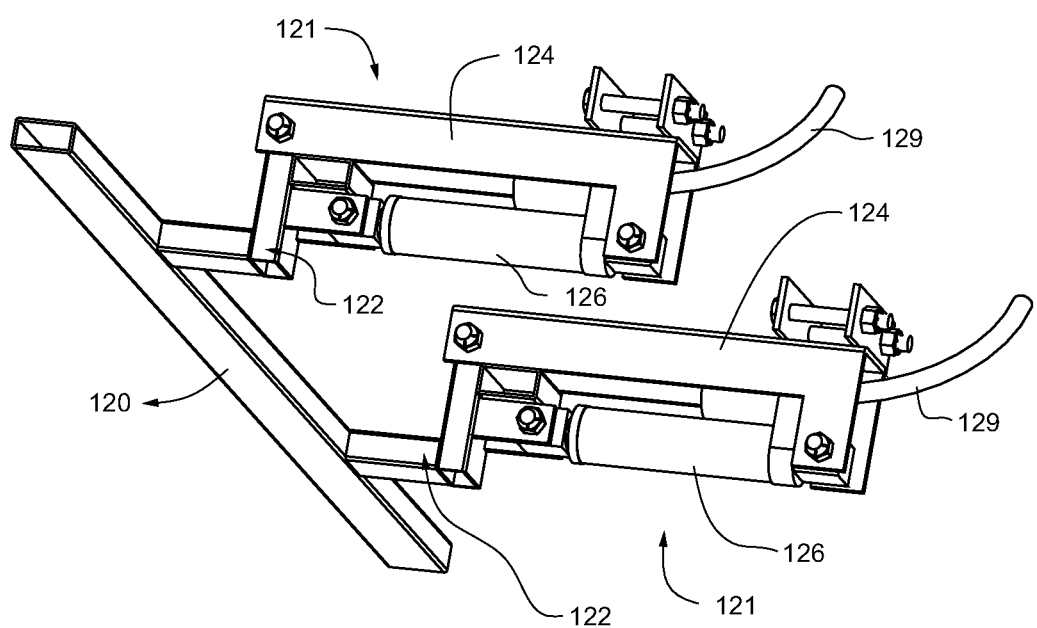
FIG. 5 shows another view of the exemplary step-up protection device in the step-up position.

FIG. 4 shows a close-up view of the device 100. As illustrated, the device 100 is in the step-up position. As shown, the device 100 includes an elongated step 120; and one or more supports 121, wherein each of the one or more supports 121 includes: a lift bar 122; a base 124; and an actuator 126; wherein the base 124 holds the actuator 126 and the lift bar 122 is attached to the base 124 on a distal end and to the step on an opposite end. In operation, when the device 100 is activated, depending on user selection, the actuator 126 either lowers the lift bar 122 causing the step 120 to be positioned for use or raises the lift bar 122 causing the step to be retracted, and if retracted, the step 120 blocks at least one door of the motor vehicle 200. Additional views of the exemplary device 100 are shown in FIG. 4B and FIG. 5.

Figure 6A:
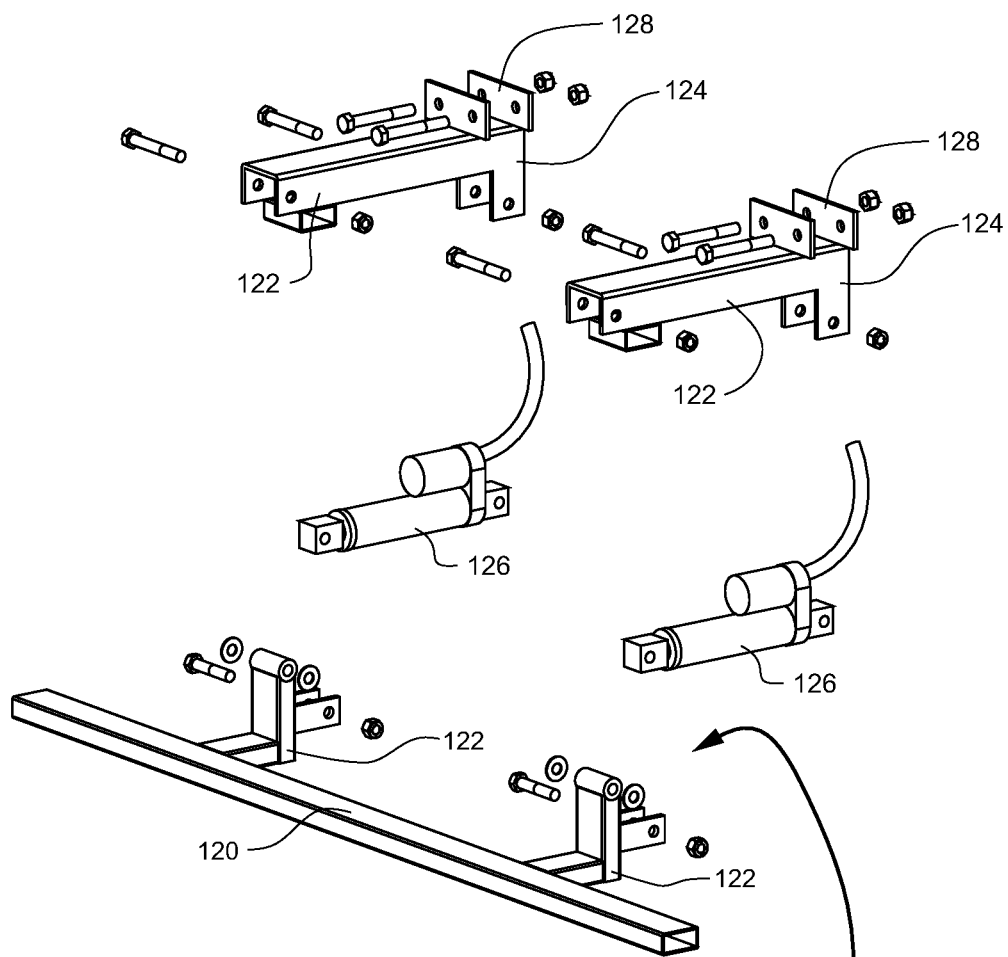
FIG. 6A shows a exploded view of the exemplary step-up protection device.
Figure 6B:
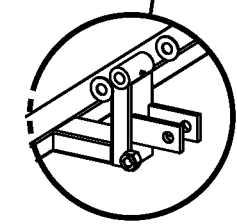
FIG. 6B shows a close-up view of the lift bar pivot connection of the device of FIG. 6A.

FIG. 6A illustrates an exploded view of the exemplary step-up protection device 100. As shown, the step 120 is affixed (e.g., by welding) to an L-shaped lift bar 122. Although the step 120 is shown as a substantially flat, elongated member, it is to be appreciated that the step 120 could be another shape, such as, for example, tubular. The lift bar 122 is pivotally attached to the base 124 on an end. Preferably, the pivotal attachment is accomplished by positioning a bolt through a slot mutual to both the lift bar 122 and the base 124 (for example, as shown in FIG. 6B). Preferably, the bolt is secured using a bolt/washer combination, as shown. Preferably, the actuator 126 is attached to the base 124 on a distal end, preferably, using a set of bolts, as shown. Preferably, the actuator 126 is a linear actuator which is affixed to the lift bar 122, as shown. Preferably, when the actuator 126 is operated the actuator 126 will either push linearly toward the lift bar 122 or linearly away from the lift bar 122. In operation, when the actuator 126 pushes linearly toward the lift bar 122, the lift bar 122 pivots upwardly lifting the step 120, and when the actuator 126 pushes linearly away from the lift bar 122, the lift bar 122 pivots downwardly lowering the step 120. Preferably, each device 100 is attachable to the underside of the motor vehicle using a set of brackets 128.

As mentioned, preferably, the actuator 126 will be a linear actuator. This actuator 126 will include an electric motor powered, preferably, by the battery of the motor vehicle 200. Preferably, the actuator will be driven by mechanical, hydraulic, or pneumatic means. Preferably, a (wired or wireless) controller will be interposed between the battery and the actuator such that a user can control operation of a pair of actuators on a side of the vehicle. For instance, the user would be able to turn on/off the actuators 122, and select whether the actuators 126 will push linearly away from/toward the lift bar 122, causing the step 120 to either to be positioned or retract. Additionally, when the current of the battery is detected as being below a predetermined voltage (e.g., using a voltmeter), circuitry can be configured to cause the actuator 126 to cause the step 120 to assume the step-up position so as not to block the door 150.

Preferably, the materials used for the device 100 can include any number of durable materials, such as stainless steel. The step 120 can include a layer of synthetic rubber or soft plastic material to provide traction. Additionally, the pivotal attachment discussed above (and shown in FIGS. 6A-B) can include nylon (or another low-friction) elements to increase wear life.

Figure 7:
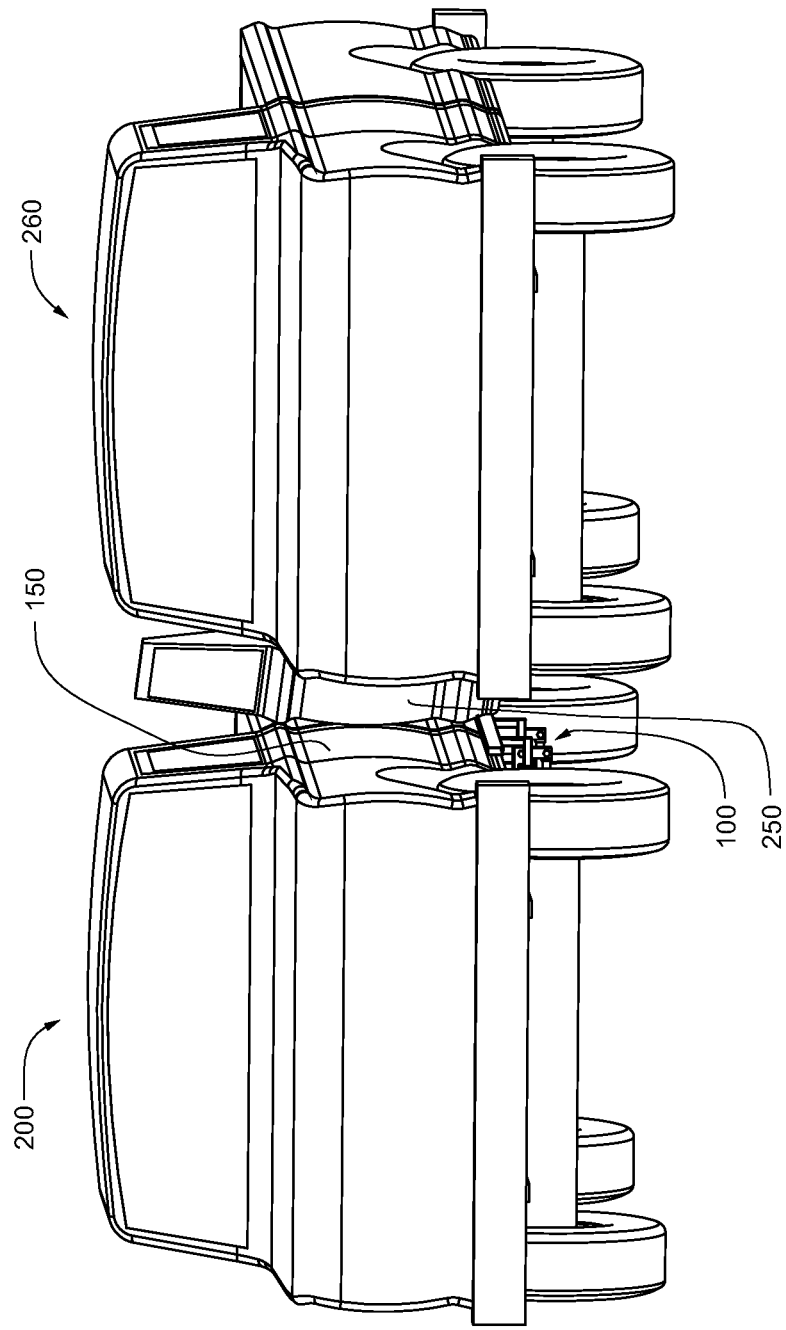
FIGS. 7 and 8A-B show the device in use to prevent a motor vehicle from being dinged.
Figure 8:
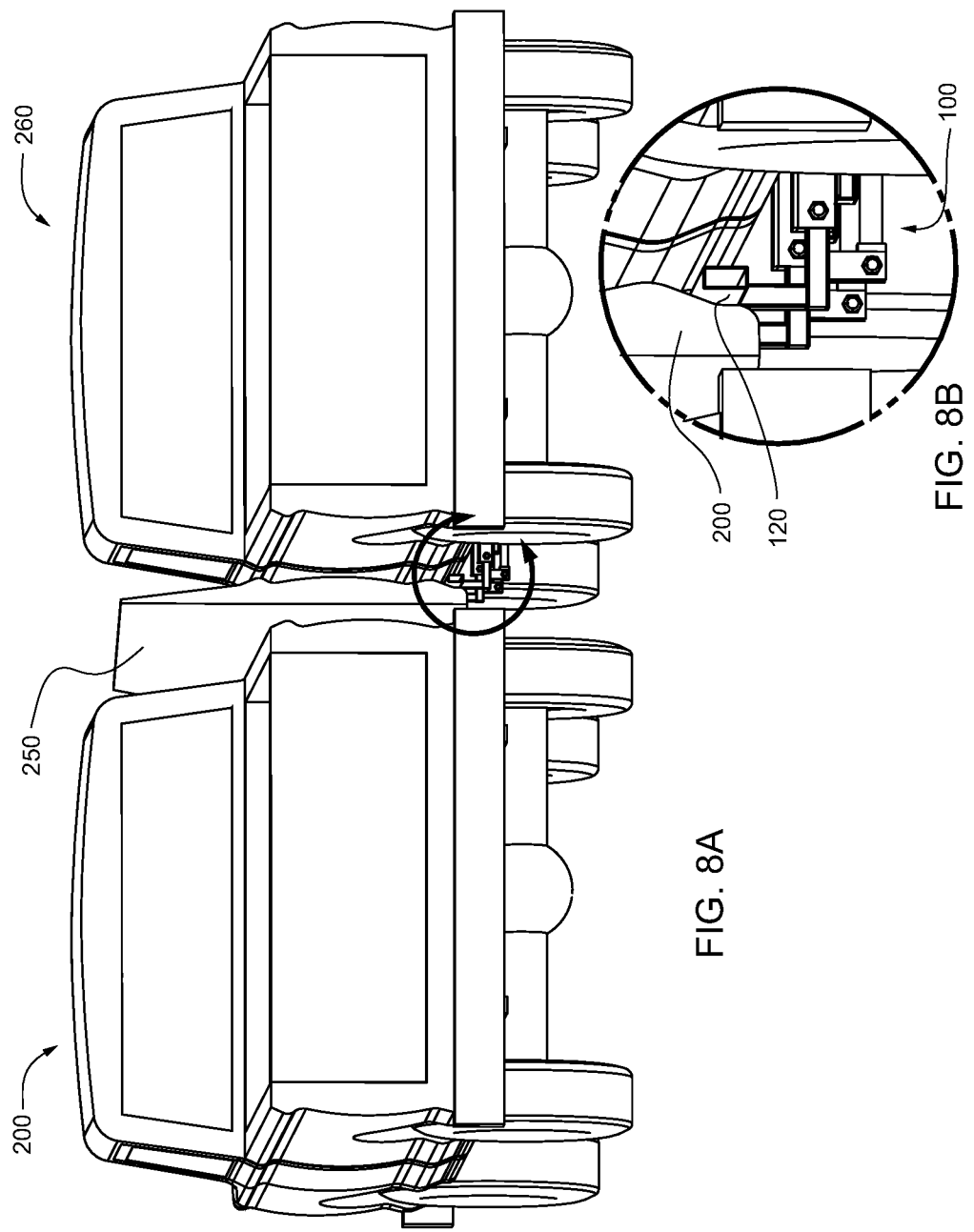

FIGS. 7 and 8A show the device 100 in use to prevent the motor vehicle 200 from being dinged. A vehicle 200 can be dinged when a person opens the door 150 of a neighboring another vehicle 260 and hits the vehicle 200, causing a small dent or scratch. FIG. 8B shows a close-up detail illustrating how the device impedes the vehicle 200 from being dinged.

Figure 9:
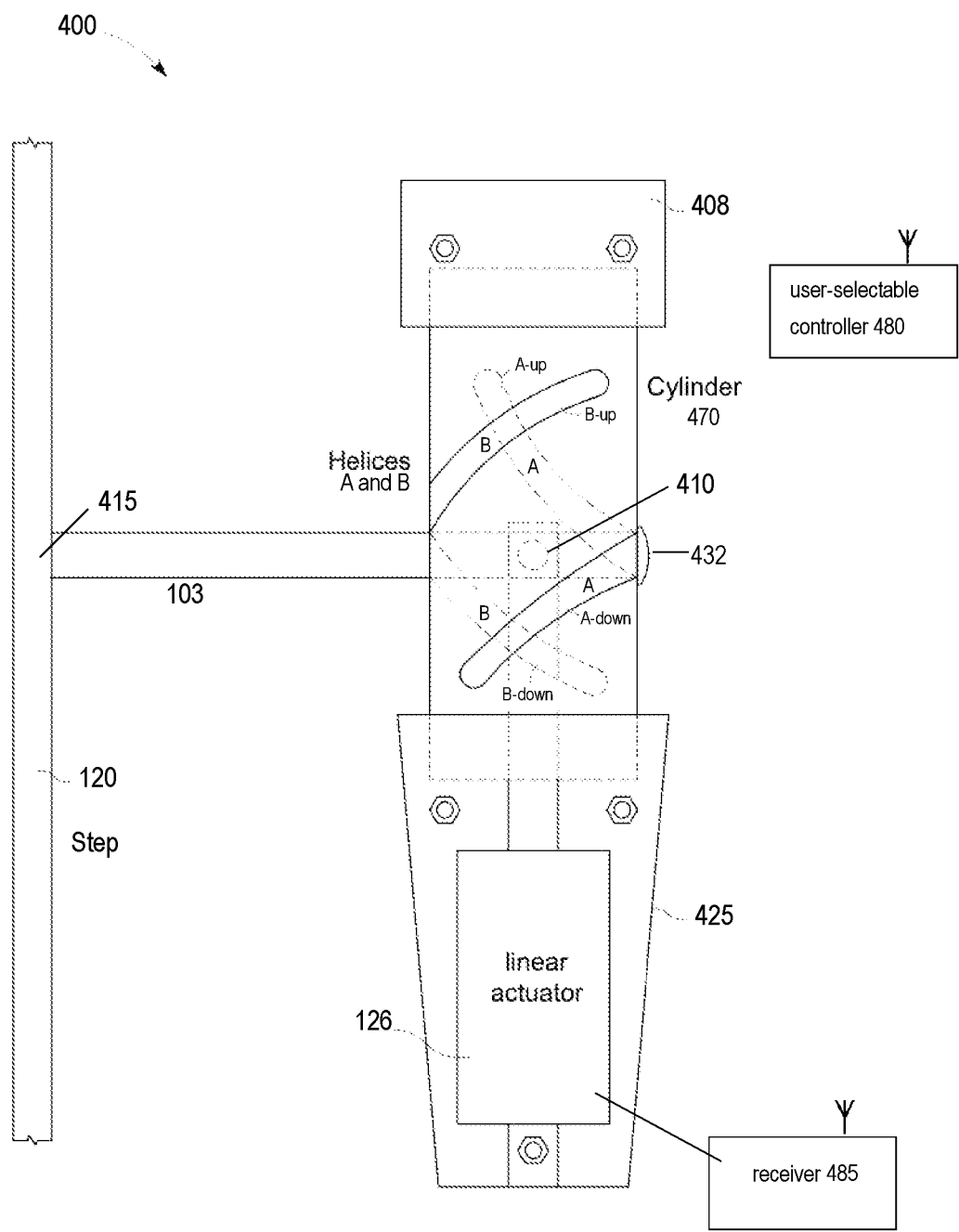
FIG. 9 shows a step-up protection device, according to another embodiment.

FIG. 9. illustrates a step-up protection device 400, according to another embodiment. The step-up protection device 400 is similar to the step-up protection device 100, discussed above, in purpose. That is to say, like the step-up protection device 100, the step-up protection device 400 can also be deployed to dually be used as a vehicle step bar and to guard the vehicle door(s) from being opened/protect the vehicle from dents (dings) and the like. The step-up protection device 400 can also be used on both the driver's side and passenger side (or just on one of the sides). The main difference between the step-up protection device 400 and the step-up protection device 100 is the mechanism used to deploy and retract the device.

Figure 10:
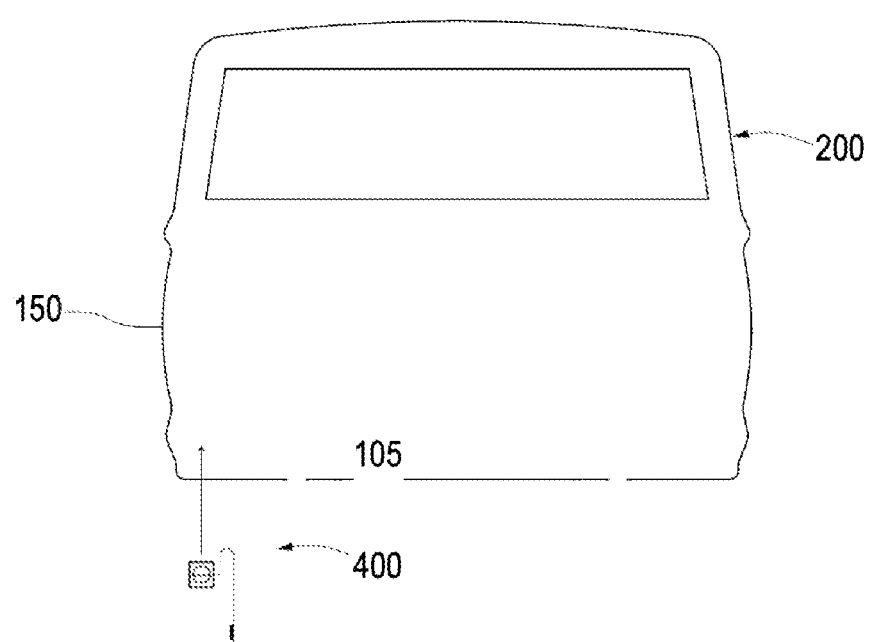
FIG. 10 shows the step-up protection device of FIG. 9 installed.

As shown in FIG. 9, the step-up protection device 400 includes the linear actuator 126, a linear actuator mount 425, a hollow cylinder 470 having a pair of helices A and B, a vehicle mount 408, a step arm 403, and a step 120. The step-up protection device 400 can be installed underneath the vehicle body 105 by using the vehicle mount 408 or another such suitable device, as shown in FIG. 10. The linear actuator 126 is an electro-mechanical device capable of pushing or pulling a sliding tube 128 in a linear motion when operated. As will be explained, this linear motion can be converted to a rotational motion to drive the step arm 403.

The hollow tube 470 can be made of stainless steel, nylon, or another suitable durable material for long-lasting usage. The hollow tube 470 can include a pair of helices A and B, as shown. The helices A, B are slots that extend through the wall of the hollow tube 470 and curve with the hollow tube 470 (but not necessarily all the way around). The distal end of the step arm 403 is attached to the sliding tube 128 of the linear actuator 126 at connection point 410, and the distal end of the step arm 403 is inserted into the hollow tube 470 such that it extends through both the helix A and the helix B. The distal end of step arm 403 is capped by cap 432. In operation, when the linear actuator 126 is activated, the sliding tube 128 either pushes or pulls the distal end of the step arm 403 linearly. Because the movement of the distal end of the step arm 403 is constrained by the hollow cylinder 470, the linear force causes the distal end of the step arm 403 to follow the path of least resistance, that is, along the helices A and B. The sliding tube 128 can rotate as it is moving linearly.

As depicted in FIG. 9, the distal end of the step arm 403 is shown in a position about in the middle of each of the helices A and B. From this vantage point, the helix A is labelled A-up and A-down, respectively, signifying the paths of the helix A from the shown position; and the helix B is labelled B-up and B-down, respectively, signifying the paths of the helix B from the shown position. Thus, in the case where the sliding tube 128 of the linear actuator 126 linearly pushes the distal end of the step arm 403, one end of the step arm 403 inserted within the hollow tube 470 will travel along path A-up while the other end will travel along path B-down. Conversely, in the case where the sliding tube 128 of the linear actuator 126 linearly pulls the distal end of the step arm 403, one end of the step arm 403 inserted within the hollow tube 470 will travel along path A-down while the other end will travel along path B-up. It is to be understood that this action converts the linear motion of the linear actuator 126 to a rotational movement of the step arm 403.

Figure 11A:
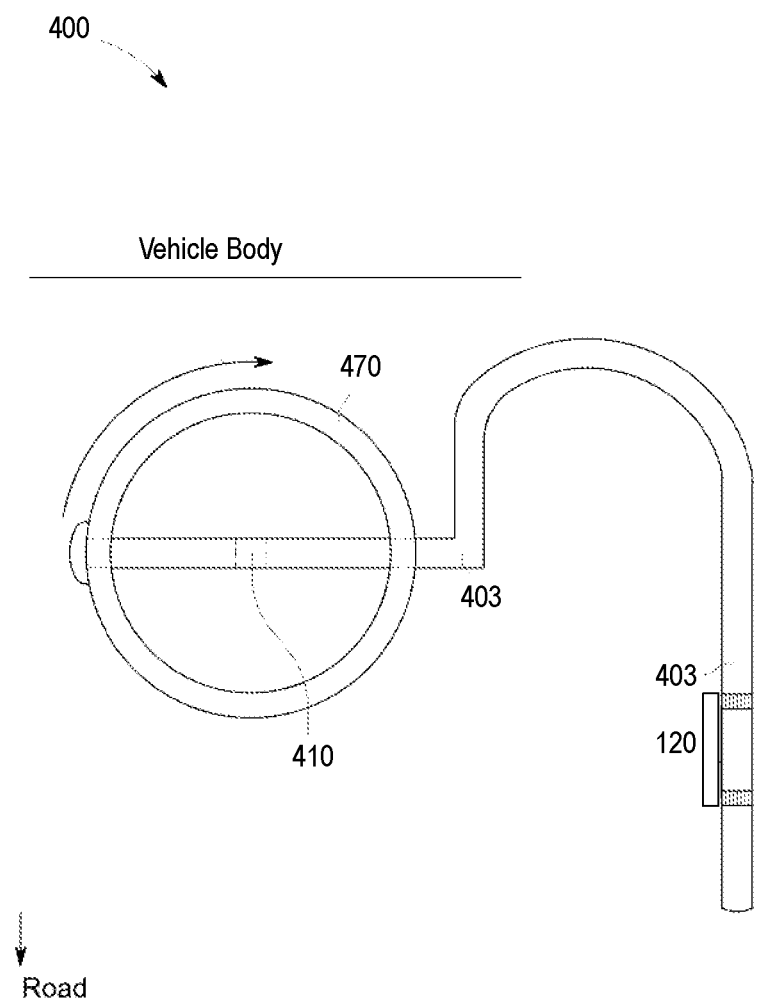
FIGS. 11A-11C show the step-up protection device of FIG. 9 in various positions.
Figure 11B:
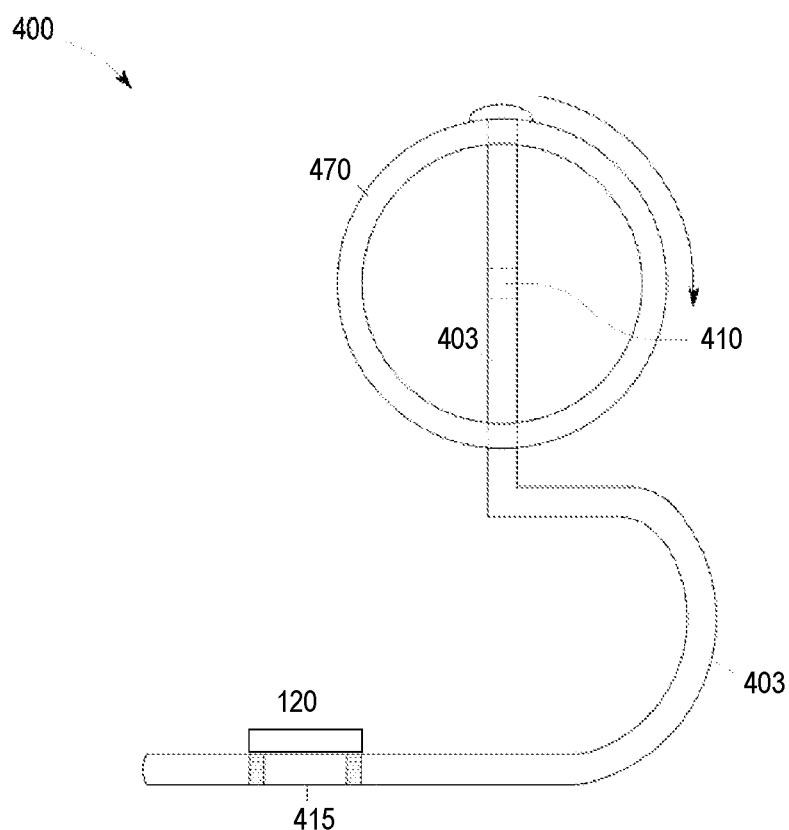
Figure 11C:
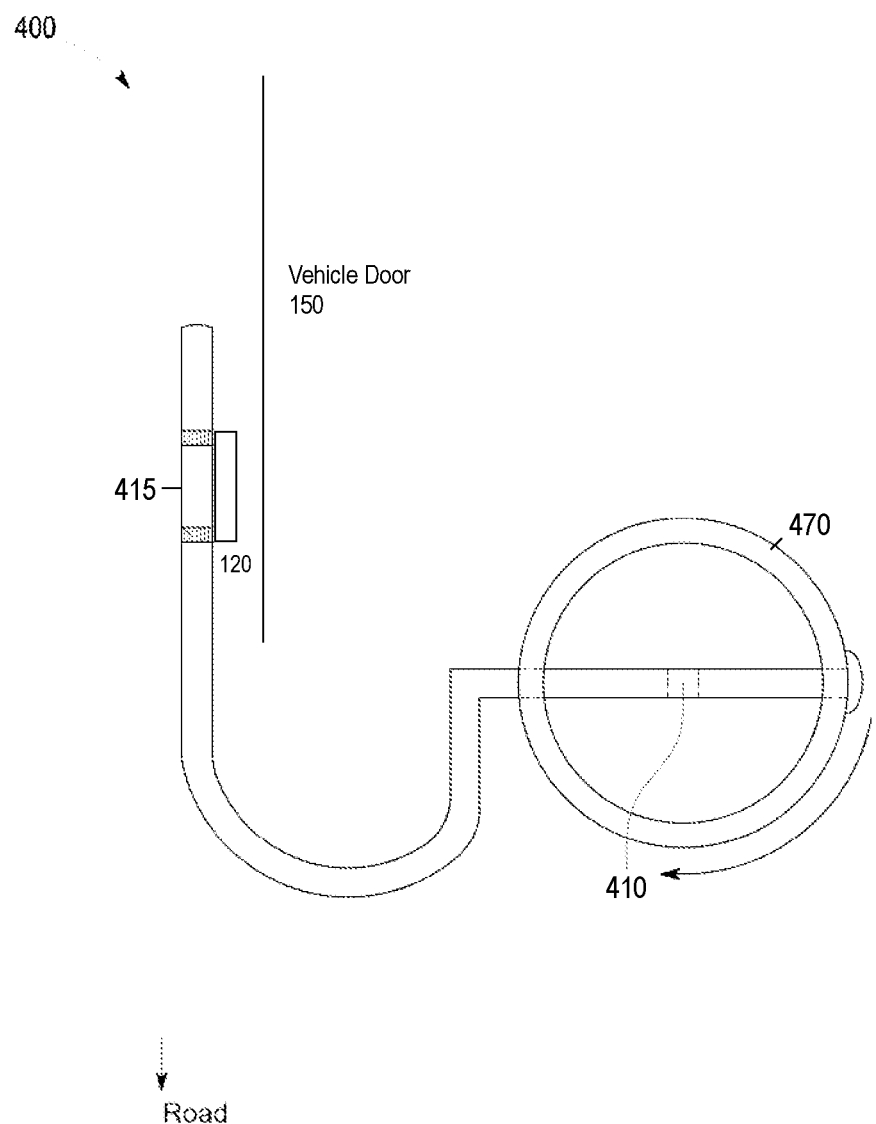

FIGS. 11A-11C illustrate the rotational movement of the step arm 403. In FIG. 11A, the step-up protection device 400 is in the retracted position. In this position, the step-up protection device 400 is disposed underneath the vehicle body. The step 120 is attached to the step arm 403 using step brackets 415. In this position, the device it is not being used. In FIG. 11B, the step-up protection device 400 is in the first deployed position. In this position, step arm 403 has rotated enough such that the step arm 403 is positioned to allow the step 120 to be used by a passenger as a step (i.e., the step 120 is approximately horizontal with the ground). In FIG. 11C, the step-up protection device 400 is in the second deployed position. In this position, step arm 403 has rotated enough such that the step arm 403 is positioned to block the vehicle door from opening. It is to be understood that a reversal of the linear actuator 126 would then cause the step-up protection device 400 to eventually assume the retracted position.

It is to be understood that the linear actuator 126 could be operated by a driver or passenger of the vehicle using a controller. As shown, a user-selectable controller 480 is in wireless communication with receiver 485 which allows a user to operate the step-up protection device to one of the desired positions (retracted, first deployed position, second deployed position). The user-selectable controller 480 could be integrated into the vehicle or be a separate device. Although a wireless controller is depicted, it is to be appreciated that a wired controller could instead of, or addition to, be used.

It is to be appreciated that various friction-reducing elements such as lubricants, bearings, nylon, coatings, etc., may be used wherever it is beneficial.

It is to be understood that although the step-up protection device 400 has been described with reference to two deployment positions, in various embodiments the step-up protection device 400 could only have one of the two deployment positions.

While this invention has been described in conjunction with the various exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A step-up protection device, comprising:
   a linear actuator;
   a hollow tube having a first helix and a second helix;
   a step arm connected at a distal end to the linear actuator such that when the linear actuator applies a linear force to the step arm, the step arm rotates;
   wherein the first helix and the second helix extend through the wall of the hollow tube.

2. The step-up protection device of claim 1, wherein a first end portion of a distal end of the step arm inserted in the hollow tube extends through the first helix and a second end portion of the distal end of the step arm inserted in the hollow tube extends through the second helix.

3. The set-up protection device of claim 1, wherein the step arm is connected to a vehicle step.

4. The set-up protection device of claim 1, wherein the step arm protection device is controlled by a user-selectable controller.

5. The set-up protection device of claim 4, wherein the user-electable controller allows the user to select a position from a set of predetermined step arm positions.

6. The set-up protection device of claim 5, wherein one of the predetermined step arm positions is a retracted position.

7. The set-up protection device of claim 5, wherein one of the predetermined step arm positions is a position such that the step is approximately horizontal with the ground.

8. The set-up protection device of claim 5, wherein one of the predetermined step arm positions is a position such that the step blocks a vehicle door.

* * * * *